US012708915B2

(12) United States Patent
Gehrung

(10) Patent No.: US 12,708,915 B2
(45) Date of Patent: Aug. 18, 2026

(54) PAINT CUP WITH VENTILATION VALVE

(71) Applicant: SATA GmbH & Co. KG, Kornwestheim (DE)

(72) Inventor: Ralf Gehrung, Backnang (DE)

(73) Assignee: SATA GmbH & Co. KG, Kornwestheim (DE)

( * ) Notice: Subject to any disclaimer, the term of this patent is extended or adjusted under 35 U.S.C. 154(b) by 521 days.

(21) Appl. No.: 17/917,641

(22) PCT Filed: Apr. 7, 2021

(86) PCT No.: PCT/IB2021/000373

§ 371 (c)(1),
(2) Date: Oct. 7, 2022

(87) PCT Pub. No.: WO2021/205236

PCT Pub. Date: Oct. 14, 2021

(65) Prior Publication Data

US 2023/0143762 A1 May 11, 2023

(30) Foreign Application Priority Data

Apr. 8, 2020 (DE) ..................... 10 2020 109 914.2

(51) Int. Cl.
*B05B 7/24* (2006.01)

(52) U.S. Cl.
CPC .......... *B05B 7/2478* (2013.01); *B05B 7/2408* (2013.01)

(58) Field of Classification Search
CPC ............................ B05B 7/2478; B05B 7/2408
USPC .......................................................... 239/337
See application file for complete search history.

(56) References Cited

U.S. PATENT DOCUMENTS

| | | | |
|---|---|---|---|
| 2,249,082 | A | 7/1941 | Jenkins |
| 2,595,317 | A | 5/1952 | White |
| 3,090,530 | A | 5/1963 | Peeps |
| 3,157,360 | A | 11/1964 | Heard |
| 3,240,398 | A | 3/1966 | Dalton |
| 3,270,920 | A | 9/1966 | Nessler |
| 3,401,842 | A | 9/1968 | Morrison |
| 3,524,589 | A | 8/1970 | Pelton |
| 3,714,967 | A | 2/1973 | Zupan |

(Continued)

FOREIGN PATENT DOCUMENTS

| | | | | |
|---|---|---|---|---|
| BE | 1018968 A3 | | 12/2011 | |
| CA | 2825226 A1 | * | 2/2014 | ......... A47G 19/2272 |

(Continued)

OTHER PUBLICATIONS

International Search Report and Written Opinion for PCT/EP2021/059080, filed Apr. 7, 2021.

(Continued)

*Primary Examiner* — Chee-Chong Lee
(74) *Attorney, Agent, or Firm* — Fleit Intellectual Property Law; Paul D. Bianco

(57) ABSTRACT

A paint cup for a paint spray gun includes a paint container which has a container wall and a base. The base is made of a natural fibrous material, in particular a cellulose-based fibrous material, so as to be pierceable and has a piercing point or region in order to ventilate the paint cup. In a method for using the paint cup with a base which is made of a natural fibrous material, the base is pierced in order to form a ventilation valve.

13 Claims, 6 Drawing Sheets

(56) References Cited

U.S. PATENT DOCUMENTS

| | | | | |
|---|---|---|---|---|
| 4,151,929 | A | 5/1979 | Sapien | |
| 4,174,070 | A | 11/1979 | Lau | |
| 4,210,263 | A * | 7/1980 | Bos | A47K 5/1202 222/453 |
| 4,270,668 | A | 6/1981 | Berfield | |
| 4,388,997 | A | 6/1983 | Grime | |
| 4,430,084 | A | 2/1984 | Deaton | |
| 4,730,753 | A | 3/1988 | Grime | |
| 4,946,075 | A * | 8/1990 | Lundback | B67D 1/0001 222/476 |
| 5,582,350 | A * | 12/1996 | Kosmyna | B05B 15/55 239/DIG. 14 |
| 5,588,562 | A | 12/1996 | Sander | |
| 5,713,519 | A | 2/1998 | Sandison | |
| 5,797,520 | A | 8/1998 | Donahue | |
| 5,954,268 | A * | 9/1999 | Joshi | A61L 9/12 239/34 |
| 6,039,218 | A | 3/2000 | Beck | |
| 6,435,426 | B1 | 8/2002 | Copp | |
| 6,474,515 | B1 | 11/2002 | Ladina | |
| 6,536,687 | B1 * | 3/2003 | Navis | B05B 7/2478 239/350 |
| 6,553,712 | B1 * | 4/2003 | Majerowski | A01M 1/2044 43/132.1 |
| D474,528 | S | 5/2003 | Huang | |
| 6,595,441 | B2 * | 7/2003 | Petrie | B05B 7/2478 239/340 |
| 6,820,824 | B1 | 11/2004 | Joseph | |
| 6,877,677 | B2 | 4/2005 | Schmon | |
| 7,083,119 | B2 | 8/2006 | Bouic | |
| 7,175,110 | B2 | 2/2007 | Vicentini | |
| D574,926 | S | 8/2008 | Huang | |
| 7,416,140 | B2 | 8/2008 | Camilleri | |
| 7,568,638 | B2 | 8/2009 | Gehrung | |
| 7,575,126 | B2 | 8/2009 | Kemper | |
| 7,614,571 | B2 | 11/2009 | Camilleri | |
| 7,694,896 | B2 | 4/2010 | Turnbull | |
| 7,798,427 | B2 | 9/2010 | Joseph | |
| 7,810,744 | B2 | 10/2010 | Schmon | |
| 7,819,341 | B2 * | 10/2010 | Schmon | B05B 7/2478 239/320 |
| 7,823,806 | B2 | 11/2010 | Schmon | |
| D644,803 | S | 9/2011 | Schmon | |
| 8,052,071 | B2 | 11/2011 | Kruse | |
| 8,297,536 | B2 | 10/2012 | Ruda | |
| 8,444,067 | B2 | 5/2013 | Schmon | |
| D689,590 | S | 9/2013 | Brose | |
| D692,530 | S | 10/2013 | Gehrung | |
| D692,532 | S | 10/2013 | Li | |
| 8,925,836 | B2 | 1/2015 | Dettlaff | |
| 9,259,960 | B1 | 2/2016 | Tepsi | |
| D758,533 | S | 6/2016 | Dettlaff | |
| 9,878,336 | B2 | 1/2018 | Gehrung | |
| D810,865 | S | 2/2018 | Hegdahl | |
| D815,248 | S | 4/2018 | Hegdahl | |
| 10,357,789 | B2 | 7/2019 | Camilleri | |
| 10,434,527 | B1 | 10/2019 | Smitshoek | |
| 10,471,450 | B2 | 11/2019 | Kruse | |
| D916,231 | S | 4/2021 | Xiao | |
| D916,232 | S | 4/2021 | Xiao | |
| D952,097 | S | 5/2022 | Kang | |
| D953,485 | S | 5/2022 | Xiao | |
| 12,544,776 | B2 | 2/2026 | Gehrung | |
| 2003/0006310 | A1 | 1/2003 | Rothrum | |
| 2004/0164182 | A1 | 8/2004 | Joseph | |
| 2005/0155968 | A1 | 7/2005 | Kosmyna | |
| 2005/0156058 | A1 | 7/2005 | Kosmyna | |
| 2006/0102550 | A1 | 5/2006 | Joseph | |
| 2006/0113409 | A1 | 6/2006 | Camilleri | |
| 2006/0196891 | A1 | 9/2006 | Gerson | |
| 2006/0283861 | A1 | 12/2006 | Kosmyna | |
| 2007/0018016 | A1 | 1/2007 | Yechouron | |
| 2007/0158349 | A1 | 7/2007 | Schmon | |
| 2007/0158462 | A1 | 7/2007 | Delbridge | |
| 2007/0164058 | A1 | 7/2007 | Burkovskiy | |
| 2007/0221754 | A1 | 9/2007 | Gehrung | |
| 2007/0272323 | A1 | 11/2007 | Verhaeghe | |
| 2008/0011879 | A1 | 1/2008 | Gerson | |
| 2008/0179763 | A1 | 7/2008 | Schmon | |
| 2009/0014557 | A1 | 1/2009 | Schmon | |
| 2009/0072050 | A1 | 3/2009 | Ruda | |
| 2009/0108089 | A1 | 4/2009 | Handzel | |
| 2010/0288772 | A1 | 11/2010 | Wambeke | |
| 2011/0174901 | A1 | 7/2011 | Dettlaff | |
| 2012/0000992 | A1 | 1/2012 | Shih | |
| 2012/0043352 | A1 | 2/2012 | Rasmussen et al. | |
| 2012/0267388 | A1 | 10/2012 | Tom | |
| 2012/0273583 | A1 | 11/2012 | Gerson | |
| 2012/0280062 | A1 | 11/2012 | Pellegrino | |
| 2012/0291890 | A1 | 11/2012 | Pan | |
| 2013/0001317 | A1 | 1/2013 | Staunton | |
| 2014/0103143 | A1 | 4/2014 | Lin | |
| 2014/0131380 | A1 | 5/2014 | Pethe | |
| 2014/0332532 | A1 | 11/2014 | Wang | |
| 2014/0339329 | A1 | 11/2014 | Lawrence | |
| 2015/0108135 | A1 | 4/2015 | Hanna | |
| 2016/0052002 | A1 | 2/2016 | Schulz | |
| 2016/0303594 | A1 | 10/2016 | Nyarbo | |
| 2017/0203887 | A1 | 7/2017 | Hegdahl | |
| 2017/0239679 | A1 | 8/2017 | Bierie | |
| 2018/0147586 | A1 | 5/2018 | Kruse | |
| 2018/0185869 | A1 | 7/2018 | Hegdahl | |
| 2019/0126300 | A1 | 5/2019 | Li | |
| 2020/0094276 | A1 | 3/2020 | Sun | |
| 2021/0078024 | A1 | 3/2021 | Hegdahl | |
| 2021/0197153 | A1 | 7/2021 | Schreiber | |
| 2022/0001406 | A1 | 1/2022 | Ruda | |
| 2022/0080435 | A1 | 3/2022 | Joseph | |
| 2023/0173515 | A1 | 6/2023 | Gehrung | |
| 2023/0271201 | A1 | 8/2023 | Dettlaff | |
| 2023/0271202 | A1 | 8/2023 | Dettlaff | |
| 2023/0278050 | A1 | 9/2023 | Dettlaff | |
| 2023/0286000 | A1 | 9/2023 | Dettlaff | |

FOREIGN PATENT DOCUMENTS

| | | | |
|---|---|---|---|
| CN | 1541176 | A | 10/2004 |
| CN | 1723088 | A | 1/2006 |
| CN | 1909970 | A | 2/2007 |
| CN | 1917960 | A | 2/2007 |
| CN | 300700565 | | 10/2007 |
| CN | 101188960 | A | 5/2008 |
| CN | 101856639 | A | 10/2010 |
| CN | 201702089 | U | 1/2011 |
| CN | 302042040 | S | 8/2012 |
| CN | 203342980 | U | 12/2013 |
| CN | 203342981 | | 12/2013 |
| CN | 204710607 | U | 10/2015 |
| CN | 107690357 | A | 2/2018 |
| CN | 207188095 | U | 4/2018 |
| CN | 108745690 | A | 11/2018 |
| CN | 109070113 | A | 12/2018 |
| CN | 208711972 | U | 4/2019 |
| CN | 208824797 | U | 5/2019 |
| CN | 110252563 | A | 9/2019 |
| CN | 209997827 | U | 1/2020 |
| CN | 209997846 | U | 1/2020 |
| CN | 111389608 | A | 7/2020 |
| CN | 212418369 | U | 1/2021 |
| CN | 212441781 | U | 2/2021 |
| CN | 306409970 | S | 3/2021 |
| CN | 212951930 | U | 4/2021 |
| CN | 213435249 | U | 6/2021 |
| CN | 306692658 | S | 7/2021 |
| CN | 213967319 | U | 8/2021 |
| CN | 214021611 | U | 8/2021 |
| CN | 214183647 | U | 9/2021 |
| CN | 214183730 | U | 9/2021 |
| CN | 214347419 | U | 10/2021 |
| CN | 307123783 | S | 2/2022 |
| CN | 307187974 | S | 3/2022 |
| CN | 307446605 | S | 3/2022 |
| CN | 307231888 | S | 4/2022 |

(56) References Cited

FOREIGN PATENT DOCUMENTS

| | | | |
|---|---|---|---|
| CN | 307381847 | S | 6/2022 |
| CN | 307382238 | S | 6/2022 |
| CN | 217043051 | U | 7/2022 |
| CN | 307456884 | S | 7/2022 |
| CN | 217450601 | U | 9/2022 |
| CN | 307525222 | S | 9/2022 |
| CN | 307525223 | S | 9/2022 |
| CN | 307525224 | S | 9/2022 |
| CN | 307525228 | S | 9/2022 |
| CN | 307525229 | S | 9/2022 |
| CN | 307525230 | S | 9/2022 |
| CN | 307525231 | S | 9/2022 |
| CN | 307554049 | S | 9/2022 |
| CN | 307554055 | S | 9/2022 |
| CN | 307629829 | S | 11/2022 |
| CN | 307645760 | S | 11/2022 |
| CN | 307816807 | S | 1/2023 |
| CN | 307903137 | S | 3/2023 |
| CN | 307903138 | S | 3/2023 |
| CN | 116620706 | A | 8/2023 |
| CN | 116967040 | A | 10/2023 |
| CN | 308254869 | S | 10/2023 |
| CN | 308254870 | S | 10/2023 |
| CN | 219970514 | U | 11/2023 |
| CN | 308662539 | S | 5/2024 |
| CN | 308923161 | S | 11/2024 |
| CN | 119216129 | A | 12/2024 |
| CN | 222267499 | U | 12/2024 |
| CN | 119588550 | A | 3/2025 |
| DE | 8024829 | U1 | 8/1982 |
| DE | 3242306 | A1 | 5/1984 |
| DE | 3402097 | A1 | 8/1985 |
| DE | 3517122 | C1 | 5/1986 |
| DE | 8813520 | U1 | 12/1988 |
| DE | 8815639 | U1 | 2/1989 |
| DE | 8902223 | U1 | 4/1989 |
| DE | 3815327 | A1 | 11/1989 |
| DE | 29702206 | U1 | 3/1997 |
| DE | 20202123 | U1 | 2/2003 |
| DE | 10213715 | A1 | 5/2003 |
| DE | 202004002445 | U1 | 6/2005 |
| DE | 202004002563 | U1 | 6/2005 |
| DE | 202004003116 | U1 | 7/2005 |
| DE | 202004003376 | U1 | 7/2005 |
| DE | 10 2004 003 439 | A1 | 8/2005 |
| DE | 102004007733 | A1 | 9/2005 |
| DE | 102004021298 | A1 | 11/2005 |
| DE | 202004014049 | U1 | 1/2006 |
| DE | 102006029802 | A1 | 3/2007 |
| DE | 202005020437 | U1 | 5/2007 |
| DE | 602004002475 | T2 | 6/2007 |
| DE | 102005063001 | A1 | 7/2007 |
| DE | 202006018491 | U1 | 4/2008 |
| DE | 202007001832 | U1 | 6/2008 |
| DE | 102007039106 | B4 | 2/2009 |
| DE | 202008014389 | U1 | 4/2010 |
| DE | 202009007151 | U1 | 10/2010 |
| DE | 102010012541 | A1 | 12/2010 |
| DE | 102009034715 | A1 | 1/2011 |
| DE | 102011008316 | A1 | 3/2012 |
| DE | 202014102561 | U1 | 7/2014 |
| DE | 10 2004 018 140 | A1 | 7/2015 |
| DE | 202015003663 | U1 | 9/2016 |
| DE | 102015006483 | A1 | 11/2016 |
| DE | 202017002680 | U1 | 8/2018 |
| DE | 102020109488 | A1 | 10/2021 |
| DE | 102020124381 | A1 | 3/2022 |
| EM | 000716527-0001 | | 5/2007 |
| EM | 000716527-0002 | | 5/2007 |
| EM | 000716527-0003 | | 5/2007 |
| EM | 000716527-0006 | | 5/2007 |
| EP | 1424135 | A1 | 6/2004 |
| EP | 1658143 | A2 | 5/2006 |
| EP | 1975079 | A1 | 10/2008 |
| EP | 1990099 | A1 | 11/2008 |
| EP | 2027931 | B1 | 2/2009 |
| EP | 2277628 | A2 | 1/2011 |
| EP | 2669213 | A1 | 12/2013 |
| EP | 2982443 | A1 | 2/2016 |
| EP | 3 053 656 | A1 | 8/2016 |
| EP | 3 078 426 | A1 | 10/2016 |
| ES | 2594332 | | 12/2016 |
| FR | 2968581 | A1 | 6/2012 |
| FR | 2982250 | A1 | 5/2013 |
| JP | 7063814 | B2 | 5/2022 |
| KR | 20150065665 | A | 6/2015 |
| WO | 2001/40102 | A1 | 6/2001 |
| WO | 2005/018815 | A2 | 3/2005 |
| WO | 2005/070557 | A1 | 8/2005 |
| WO | 2005/077543 | A1 | 8/2005 |
| WO | 2006098623 | A1 | 9/2006 |
| WO | 07/003245 | A1 | 1/2007 |
| WO | 2007/079188 | A2 | 7/2007 |
| WO | 2009/054986 | A1 | 4/2009 |
| WO | 2009090273 | A1 | 7/2009 |
| WO | 2010/044864 | A1 | 4/2010 |
| WO | 2011/047876 | A2 | 4/2011 |
| WO | 2011/090857 | A1 | 7/2011 |
| WO | 2012/009284 | A2 | 1/2012 |
| WO | 2013/131626 | A1 | 9/2013 |
| WO | 2013/134182 | A1 | 9/2013 |
| WO | 2013/165556 | A1 | 11/2013 |
| WO | 2017/146993 | A1 | 8/2017 |
| WO | 2018/019412 | A1 | 2/2018 |
| WO | 2019/162397 | A1 | 8/2019 |
| WO | 20/006861 | A1 | 1/2020 |
| WO | 2021/028401 | A1 | 2/2021 |
| WO | 2021/204885 | A1 | 10/2021 |
| WO | 2021/205236 | A1 | 10/2021 |
| WO | 2022/023465 | A1 | 2/2022 |
| WO | 2022/023466 | A1 | 2/2022 |
| WO | 2022/023467 | A1 | 2/2022 |
| WO | 2022/023468 | A1 | 2/2022 |
| WO | 22/218119 | A1 | 10/2022 |
| WO | 23/035890 | A1 | 3/2023 |
| WO | 23/061205 | A1 | 4/2023 |
| WO | DM226675 | | 4/2023 |

OTHER PUBLICATIONS

German Search Report dated Sep. 18, 2020 for Application No. 10 2020 109 913.4 (English trans).

English translation of Written Opinion for PCT/EP2021/059080, filed Apr. 7, 2021.

English translation of Written Opinion for PCT/IB2021/000373 filed Apr. 7, 2021.

International Preliminary Report on Patentability dated Jan. 31, 2023, with Written Opinion, for PCT/EP2021/071254, filed Jul. 29, 2021.

International Preliminary Report on Patentability dated Jan. 31, 2023, with Written Opinion, for PCT/EP2021/071252, filed Jul. 29, 2021.

International Preliminary Report on Patentability dated Jan. 31, 2023, with Written Opinion, for PCT/EP2021/071255, filed Jul. 29, 2021.

Office Action dated Dec. 16, 2024 for U.S. Appl. No. 17/917,619.

For U.S. Appl. No. 15/575,585: Office Action dated Jul. 18, 2018, Response filed Nov. 9, 2018 Final Rejection dated Feb. 5, 2019, Response filed Jun. 5, 2019 Notice of allowance dated Jul. 10, 2019.

For PCT/EP2016/000809: International Preliminary Report on Patentability, dated Nov. 28, 2018 Written Opinion, dated Aug. 4, 2016 International Search Report, dated Jul. 14, 2016.

For Design U.S. Appl. No. 29/510,723: Restriction Requirement dated Nov. 3, 2015 Response filed Jan. 4, 2016 Notice of Allowance dated Jan. 27, 2016.

International Search Report and Written Opinion for PCT/EP2021/71254, filed Jul. 29, 2021.

International Search Report and Written Opinion for PCT/EP2021/71252, filed Jul. 29, 2021.

International Search Report and Written Opinion for PCT/EP2021/71255, filed Jul. 29, 2021.

(56) References Cited

OTHER PUBLICATIONS

International Search Report and Written Opinion for PCT/EP2021/71253, filed Jul. 29, 2021.
Search Report for DE 10 2020 120 226.1, dated Dec. 22, 2020.
Search Report for DE 10 2020 120 229.6, dated Dec. 22, 2020.
Search Report for DE 10 2020 120 228.8, dated Dec. 22, 2020.
Search Report for DE 10 2020 120 231.8, dated Dec. 22, 2020.
International Search Report and Written Opinion for PCT/IB2021/000373 filed Apr. 7, 2021.
German Search Report dated Sep. 26, 2020, for German Application No. 10 2020 109 914.2.
For U.S. Appl. No. 18/017,918: Notice of Allowance f dated Jan. 28, 2026 Supplemental Notice of Allowance dated Feb. 11, 2028.
For Chinese Patent Application No. 2021800585545: Second Office Action dated Oct. 11, 2025.
For Chinese Patent Application No. 2021800264648: First Office Action dated Nov. 15, 2025.
Or Chinese Application No. 2021800585545: First Office Action dated Apr. 23, 2025 Search Report dated Jul. 29, 2021 with English translation.
For U.S. Appl. No. 18/017,897: Interview Summaries dated Aug. 14 & 18, 2025 Response and RCE filed Aug. 22, 2025.
For U.S. Appl. No. 18/017,910: Office Action dated Feb. 14, 2025 Response filed Jun. 16, 2025 Final Office Action dated Aug. 19, 2025.
For Chinese Application No. 2021800588295: First Office Action dated Apr. 30, 2025 i.
Ex parte Quayle Office Action dated Mar. 5, 2026 for U.S. Appl. No. 29/952,685.
Office Action dated Mar. 9, 2026 for U.S. Appl. No. 18/017,910.
Final Office Action for U.S. Appl. No. 17/917,619 dated May 15, 2025.
For U.S. Appl. No. 18/017,897: Office Action dated Sep. 12, 2025 Interview Summary dated Dec. 5, 2025 Response filed Dec. 11, 2025.
Office Action dated Oct. 21, 2025 for U.S. Appl. No. 18/017,933.
For U.S. Appl. No. 17/917,619: Notice of Allowance (dated Oct. 10, 2025) and Corrected Notice of Allowance (dated Oct. 21, 2025).
For U.S. Appl. No. 18/017,910: Interview Summary dated Nov. 28, 2025.
Final Office Action dated May 22, 2025 for U.S. Appl. No. 18/017,897.
Response to Office Action filed Apr. 16, 2025 for U.S. Appl. No. 17/917,619.
Office Action dated Apr. 16, 2025 for U.S. Appl. No. 18/017,933.
Office Action dated Feb. 14, 2025 for U.S. Appl. No. 18/017,910.
Office Action dated Feb. 28, 2025 for U.S. Appl. No. 18/017,918.
For U.S. Appl. No. 18/017,918: Response to Office Action filed May 28, 2025 Final Office Action dated Jun. 11, 2025.
Office Action dated Feb. 3, 2025 and Response filed May 5, 2025 or U.S. Appl. No. 18/017,897.
For Chinese Patent Application No. 2021800584932: Second Office Action dated Oct. 28, 2025.
For Chinese Patent Application No. 2021800584932: Notification of the First Chinese Office Action dated Apr. 18, 2025 Search Report dated Apr. 16, 2025.

* cited by examiner

PAINT CUP WITH VENTILATION VALVE

FIELD OF THE INVENTION

The invention relates to a paint cup for a paint spray gun.

BACKGROUND

Paint cups for paint spray guns have a usually closable container for paint, which can be coupled to a paint spray gun via a paint discharge opening, thus enabling paint to flow out of the paint cup into the paint spray gun (paint flow cup), where the paint is atomized by means of compressed air. To ensure that, when paint is removed from the paint cup, reduced pressure does not arise in the interior of the paint cup, making it more difficult for the paint to flow, such paint cups usually have, on the side facing away from the spray gun, a ventilation valve for atmospheric connection of the interior of the paint cup to the environment.

A compensating valve is known from DE 10 2011 008 316 A1, the compensating valve being integrated into a paint cup base made of plastic. Such ventilation valves require a high production outlay.

SUMMARY

One aspect of the invention relates to a paint cup having a compensating valve which can be manufactured economically.

A paint cup according to the invention for a paint spray gun comprises a paint container having a vessel wall and a base, wherein the base is made of a natural fibrous material so as to be pierceable. The base has a piercing point or region for ventilating the paint cup, which is pierced to put the spray gun into operation. The piercing point or region can preferably be indicated optically and/or haptically. The indication can be implemented, for example, by a printed or stamped marking. However, the identification could also be in the form of a stick-on label.

Natural fibrous material or plant-based materials are to be understood to mean materials such as paper, cardboard, hard paper, paperboard, corrugated cardboard or even composite materials which contain one of the abovementioned material plies. In particular, it is a cellulose-based fibrous material. The natural fibrous material is embodied, for example, as a paper material which is produced from mechanical pulp, chemical pulp, semichemical pulp or waste paper by bonding or pressing together. In particular, if the vessel wall and the base are integrally, i.e. not detachably, connected to one another, the vessel wall can also advantageously be produced from a natural fibrous material.

Further embodiments are also disclosed herein.

In an advantageous embodiment, the piercing point or region can be formed identically to the rest of the base. In other words, the base thus has a wall thickness which is the same throughout. The manufacturing outlay is thereby limited to a minimum.

In one embodiment, the base can be of substantially radially symmetrical design and the piercing point or region can expediently be arranged eccentrically, for example in the edge region. Arrangement in the edge region has the advantage that the base is stiffer near the edge than centrally and thus the base can be made thinner, for example, than if the piercing point or region were arranged centrally.

In an advantageous embodiment, the piercing point or region may have a weakening. Alternatively, the base can have a reinforcement around the piercing point or region. The weakening can be introduced in the form of a stamped predetermined breaking point, for example. The reinforcement can be embodied, for example, in the form of an additional reinforcement, in particular in the form of a circular ring, which is applied around the piercing point or region and which is connected materially to the base.

It is conceivable and possible to combine the marking and reinforcement with one another, for example in the form of an annular stick-on label which borders the piercing region so as to mark it and at the same time reinforces the surrounding region of the piercing point or region.

The paint cup can expediently comprise a piercing spike, which is preferably substantially rotationally symmetrical, for penetration of the base. In particular, the piercing spike is embodied in such a way that a ventilation valve for producing pressure compensation is formed by penetration of the base at the piercing point or region.

The piercing spike preferably has a penetration tip, by means of which it can pierce the base.

Alternatively, the piercing spike can also be provided with a thread, by means of which the piercing spike can be screwed into the base.

In the case of a particularly preferred exemplary embodiment, the piercing spike is embodied in such a way that at least one closable ventilation channel is formed by penetration of the base at the piercing point or region.

The ventilation channel can be stamped, for example, as an axially extending groove in the piercing spike. As an alternative or in addition, it is also possible to form the ventilation channel analogously to a hollow needle as a centrally extending tube in the piercing spike.

In one embodiment, the closable ventilation channel is passed through the piercing spike. A valve can preferably be arranged in the ventilation channel, which is routed centrally through the piercing spike, at least in some section or sections, for example. By way of example, mention may be made of a duckbill valve, honey valve or diaphragm valve, made, for example, of an elastomer, which opens automatically when a reduced pressure arises in the interior of the paint cup and, in the open state, allows air to flow into the paint cup in order to equalize the pressure. It is self-evident that a valve design which can be opened and closed manually, such as a switching, plug-in, pivoting, tilting or rotary valve, can also be used.

A preferred variant in which the closable ventilation channel is routed along the outer circumference of the piercing spike is distinguished by a simple and at the same time functionally reliable construction.

The piercing spike can preferably be designed to have two or more stages with stepped diameters situated one above the other, with the result that the base is in contact with a first, second or further stage of the piercing spike, depending on the axial position of the piercing spike relative to the base. Since the base can be penetrated in two or more stages, various valve states can be implemented, e.g. in a non-sealing manner in one stage in order to produce pressure compensation (first penetration state) and in a sealing manner in another stage (second penetration state).

Alternatively or in addition to the embodiment of the piercing spike which makes it possible to achieve a sealing (second) penetration state, the ventilation opening in the base can also be closed by some other element, such as a closure tab or a closure plug (optionally with a screw-in thread), which can be introduced into the opening or applied to the opening after the removal of the piercing spike.

It is advantageous if the piercing spike has a ventilation channel which extends primarily axially. The ventilation channel can extend over one or more stages of the piercing spike. Gas exchange between the interior of the container and the environment is possible via the ventilation channel. For this purpose, the ventilation channel or the piercing spike must be arranged in such a way that the ventilation channel extends through the base.

In some variant embodiments, a plurality of ventilation channels can be provided. It is thereby possible to reduce the cross section of individual ventilation channels and/or to increase the maximum throughput of gas.

The piercing spike can be produced from a plant-based material or from a plastic. It is also possible for the piercing spike to be produced as a material composite of different materials, e.g. as a hollow needle produced from metal and surrounded by a plastic. The piercing spike can be provided for single use or multiple use. In particular, the piercing spike is produced in one piece from plastic by injection molding.

Before insertion into the base, the piercing spike can preferably be connected in a captive manner to the paint container. Thus, for example, it can be delivered as a unit with the paint container, using a film hinge, a tab, a thread or the like.

The piercing spike can expediently have modified sealing surfaces, for example in the form of one or more sealing rings or sealing surfaces, preferably of an elastomeric material, connected to or with the piercing spike.

In the case of a particularly preferred exemplary embodiment, the piercing spike has retaining means for fixing the piercing spike on the paint container in at least one stage (penetration state), the retaining means preferably being designed as a circumferential fixing groove.

Alternatively, the retaining means can also be arranged as expanding hooks, similar to expansion plugs, in the region of the tip of the piercing spike, and these can reliably prevent the piercing spike from falling out after penetration of the base.

The piercing spike preferably has at least four axially successive stages, wherein the first stage forms a penetration tip, the second stage a ventilation dome (in particular with one or more groove-shaped ventilation channels), the third stage a sealing dome (in particular with a circumferential spherical sealing surface) and the fourth stage an actuating cap, which preferably projects on the outside of the base.

Particularly preferred is a variant in which a first circumferential fixing groove is arranged between the ventilation dome and the sealing dome and/or a second fixing groove is arranged between the sealing dome and the actuating cap. In the first (non-sealing, ventilating) penetration state, the piercing spike is fixed in that the base is arranged in the first fixing groove. In the second (sealing) penetration state, the piercing spike is fixed in that the base is arranged in the second fixing groove.

As already mentioned, it is advantageous for effective ventilation if the piercing spike has one or more axially extending ventilation channels, preferably in the form of one or more axially extending grooves, which are preferably arranged on the circumference of the ventilation dome.

In order to ensure that the ventilation channel or channels lead through the base, at least in the first penetration state, it is advantageous if the piercing spike has one or more axially extending ventilation channels, which continue into one or more radially extending ventilation channels on an end face of the piercing spike, preferably on an end face of the sealing dome.

A variant of the invention in which the vessel wall and/or the base are/is made of cardboard (weight per square meter over 200 g/m$^2$) has proven to be useful in practice, the vessel wall and/or the base preferably being provided, at least on the inside, with a liquid-resistant, preferably solvent-resistant coating, in particular of plastic and/or aluminum, for use with a paint spray gun.

For example, single-ply, two-ply or three-ply, in particular single- or double-laminated, cardboard may be mentioned as advantageous paper material for the vessel wall and/or the base.

In one embodiment, the base can be integrated into a lid system that is detachably connected to the vessel wall. This means that the base with the piercing point or region is independent of the remainder of paint container, thus enabling the base to be produced from one material and the paint container from another material, for example.

It is particularly advantageous if the lid system or at least further parts of the lid system consist of the same material as the base, e.g. a plant-based material. Particularly in the case of integral production of the lid system, the production process can be considerably simplified in comparison with hybrid lid systems.

In one variant, a second base of the paint cup facing the paint gun can be of frustoconical design, that is to say can be in the form of a cone section or similar to a cone section. The second base can optionally be provided with an interface for connection to the paint spray gun or for connection to an adapter for connection to the paint spray gun.

The second base is expediently designed as a lid which is releasably connected to the paint cup. In this case, the paint cup is suitable for use as an upside-down cup.

As an option, the paint cup has a further opening, which can be closed with a further lid, for replenishing paint on the side facing away from the paint spray gun.

A method according to the invention envisages that, in one embodiment, the use of the above-described paint cup is carried out in such a way that the base is pierced for venting. Such a method saves the expenditure for the production of a valve integrated into the base.

BRIEF DESCRIPTION OF THE DRAWINGS

Advantageous embodiments and further features of the invention will be found in the figures and the following description of the figures. Here, identical or at least comparable features are denoted by the same reference signs.

More specifically.

DETAILED DESCRIPTION

Figure 3:
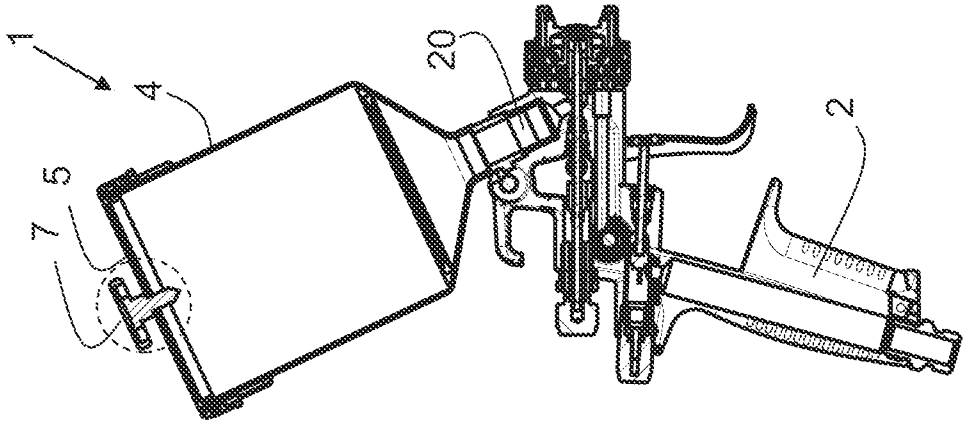
FIGS. 1 to 3 show a paint cup according to the invention for a paint spray gun in a side, a front and a sectional view with an opening closed by a lid comprising a pierceable base.

According to the exemplary embodiment of FIGS. 1 to 7, a paint container 3 for receiving paint is illustrated with a paint cup 1 having a base 5 and a piercing spike 7, which penetrates the base 5. In this case, the paint container 3 comprises an outer, here circular-cylindrical, vessel wall 4, adjoining the underside of which is a funnel-shaped extension with an outlet opening 20 for paint. The outlet opening 20 is detachably connected to the paint spray gun 2 via a corresponding connection. Due to gravity, paint in the paint container 3 flows into the paint spray gun 2 and remains there until it is taken along and atomized by a compressed air flow provided by the paint spray gun 2.

On the upper side, for example on the side facing away from the paint spray gun 2, the paint cup 1 has an opening 30 configured as a refill opening, which is closed by means of a lid system 9. Paint can be replenished at any time via the opening 30 with the lid system 9 removed, even when the paint cup 1 is mounted on the paint spray gun 2. The refill opening 30 is formed by the end 4' of the vessel wall 4. The opening 30 is closed by means of the lid system 9 comprising the lid 10 and the counter-ring 14.

Figure 2:
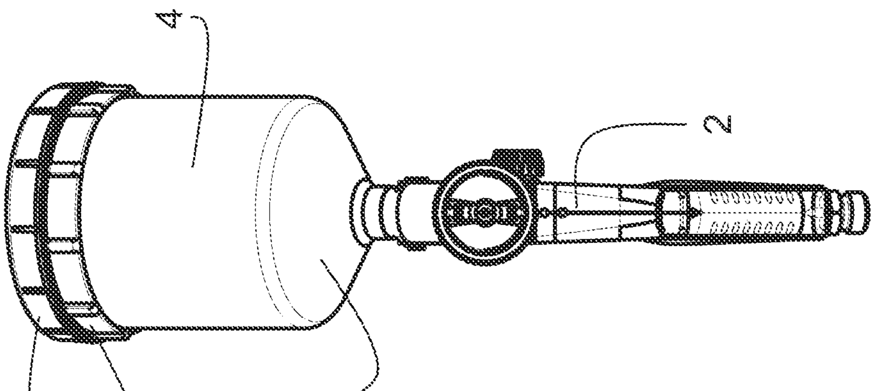
Figure 1:
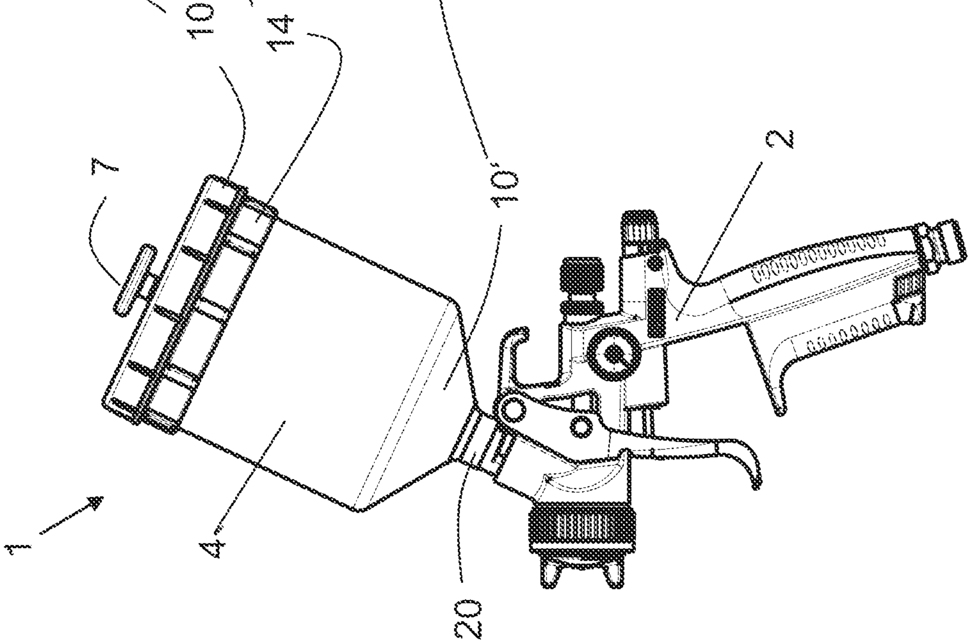

The lid 10 comprises a base 5 with a piercing region 6, which is pierced by a piercing spike 7 in a first, non-sealing (ventilating) penetration state in the depictions in FIGS. 1 to 3. The piercing region 6 is made optically identifiable, e.g. by a printed-on circular ring.

The piercing spike 7 produces an atmospheric connection between the interior of the container of the paint cup 1 and the environment via a ventilation channel 8, which is not illustrated here. Further details regarding the piercing spike 7 and the base 5 are discussed in the explanations of FIGS. 8 and 9*a* to 9*b*.

Figure 6:
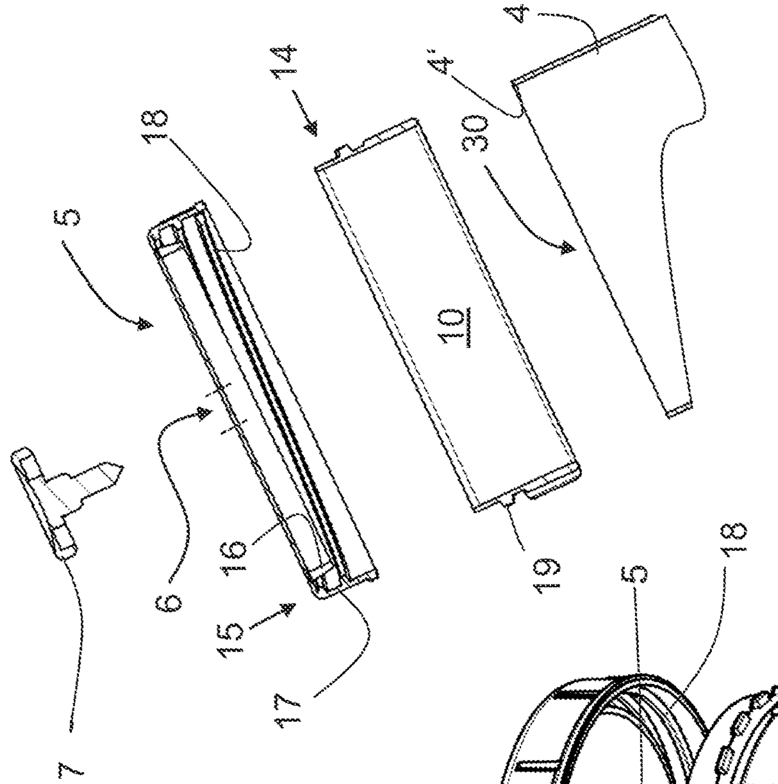
FIGS. 4 to 6 show detail views of the lid system from FIGS. 1 to 3 in a side, a front and a sectional view in an exploded illustration.
Figure 5:
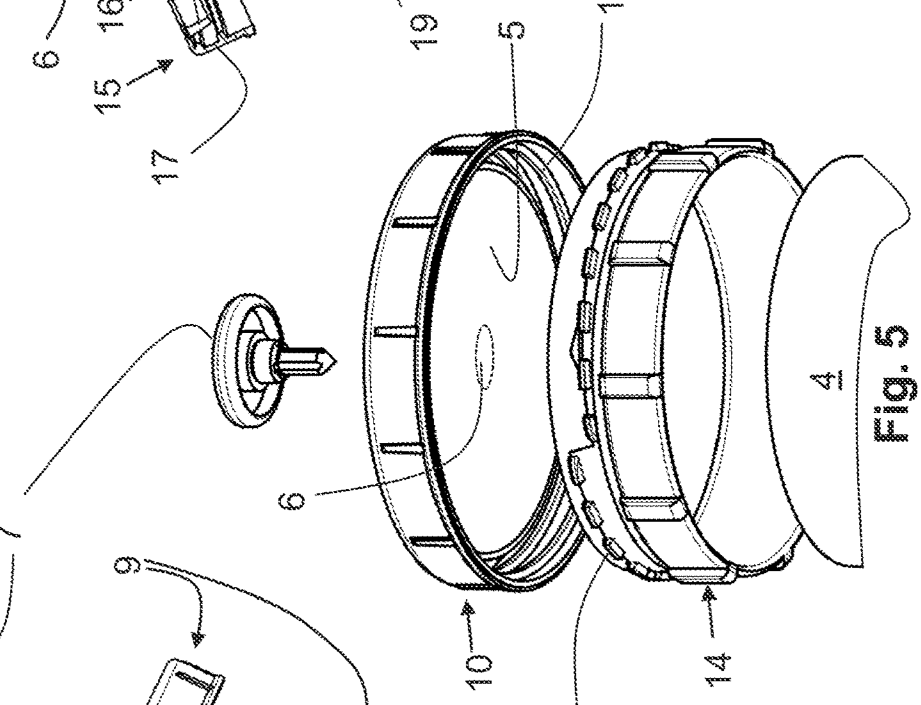
Figure 4:
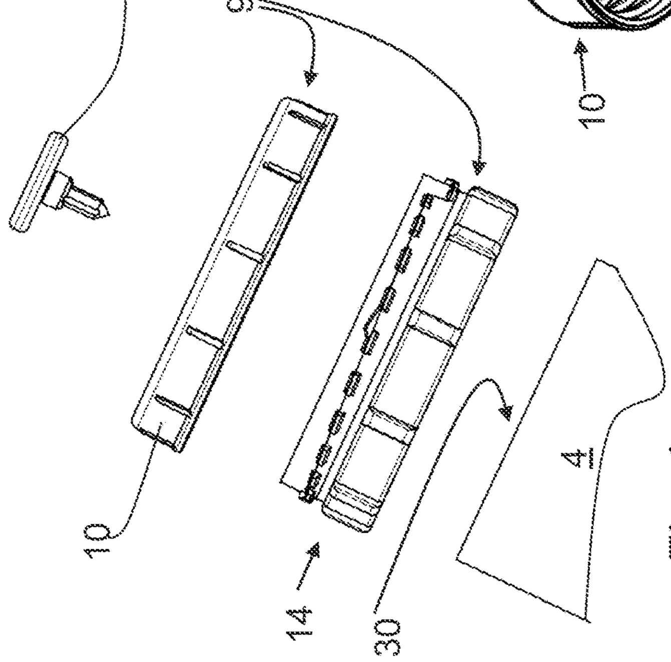
Figure 7:
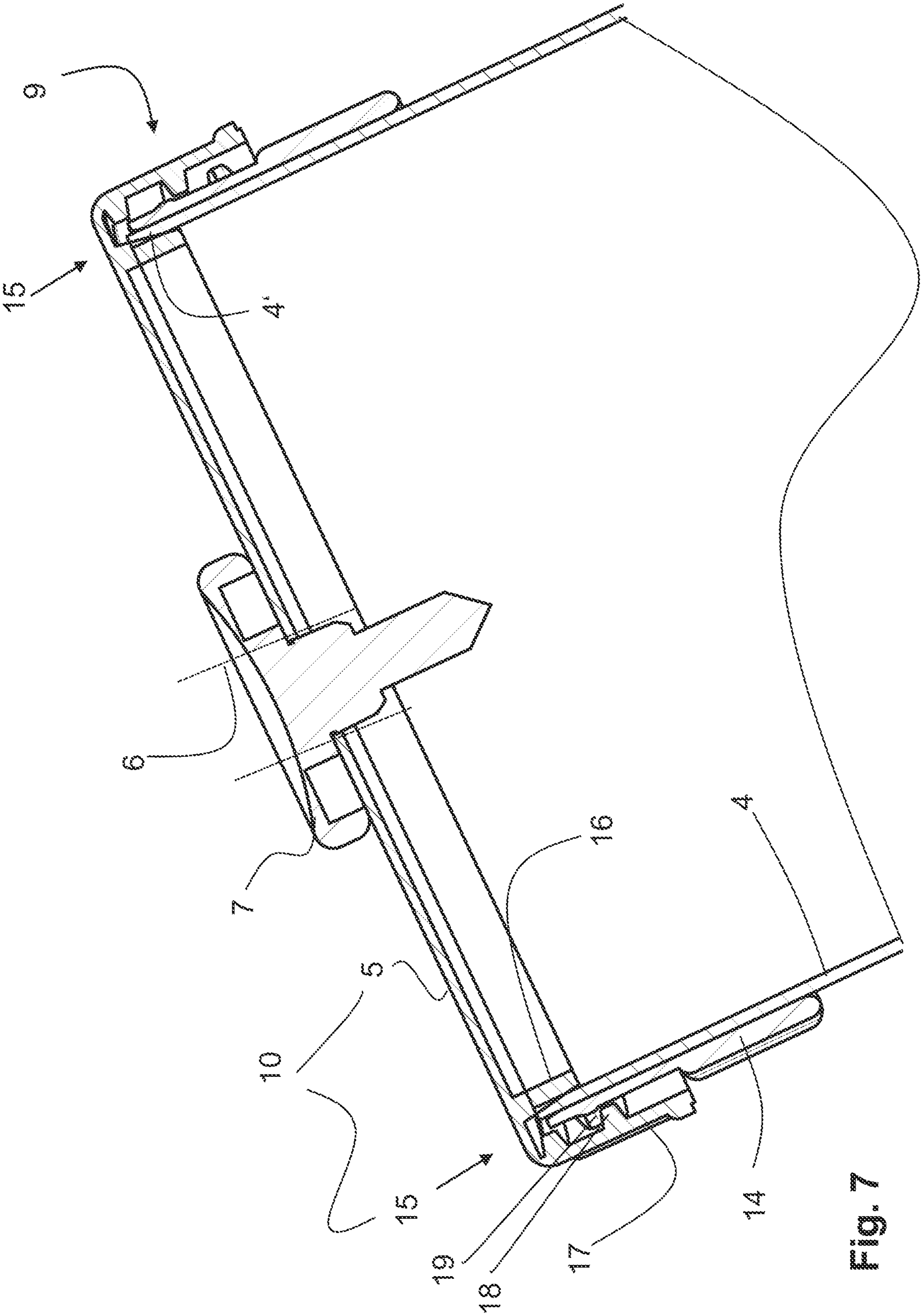
FIG. 7 shows a detail view of the lid system in the state connected to the paint container.

The lid system 9, portions of which are shown in an exploded illustration in FIGS. 4 to 6 and which is shown in the assembled state in FIG. 7, is constructed as follows:

The lid 10 comprises a U-shaped hollow collar 15 with an inner and an outer cylindrical collar 16 and 17, respectively, in which the counter-ring 14 and an end section 4' of the vessel wall 4 are accommodated under stress. The counter-ring 14 and the hollow collar 15 are detachably connected via corresponding threads 18 and 19, respectively, which are situated on the outer circumference of the end of the vessel wall 4 and on the inner circumference of the outer cylindrical collar 17. The inner cylindrical collar 16 is of wedge-shaped design, with the result that a tapering gap is formed between the inner and outer cylindrical collars 16 and 17, respectively, into which gap the counter-ring 14 and the end section 4' of the vessel wall 4 are radially clamped or braced with increasing screw fastening.

The base 5, which extends in the form of a circular disk over the area enclosed by the hollow collar 15, is formed on the hollow collar 15. The base 5 is integrally formed on the hollow collar 15 or formed with the hollow collar 15. Like the hollow collar 15 itself, it consists of a natural fibrous material such as, for example, paper or cardboard.

The lid 10 can consist, for example, of a mixture of cell particles pressed together. The mixture of cell particles can expediently be enriched with reinforcing binders or fillers such as, for example, a resin-based adhesive or the like (similar to a composite chipboard).

This increases the strength and makes it possible, for example, to introduce a strong thread into the outer collar 17 of the hollow collar 15 of the lid 10.

In alternative embodiments, which are not shown in the figures, the hollow collar 15 and the base 5 are produced in two or more parts. For example, the hollow collar 15 can be produced as an injection molding from a suitable plastic, to which the base 5, produced from natural fibrous material, is laminated on the upper side (side facing away from the paint spray gun 2) or the lower side (side facing the paint spray gun 2) of the hollow collar 15. A base 5 made of natural fibrous material attached in this way has greater stability than, for example, a similarly attached base 5 made of a plastic film.

Although natural fibrous materials must prima facie always be opaque, the base 5 can also be produced in opaque or translucent or transparent form. Materials suitable for this purpose made of cellulose or plant-based materials and binders which connect these materials appropriately, such as, for example, resin-based adhesives, are known to a person skilled in the art.

The stability of the base 5 permits the use of a piercing spike 7, with which the piercing point or region 6 of the base 5 can be pierced. Here, the piercing point or region 6 is arranged centrally or radially centrally on the base 5 and could be identified, for example, by a colored marking. However, it could also be arranged off-center and in particular close to the edge in order to reduce the flexibility of the base 5 and to increase the resistance of the base 5 during penetration. As an alternative or in addition, the region of the base 5 could also be reinforced in some region or regions around the piercing point or region 6, e.g. by means of a laminated-on second, annular layer. This makes it possible to prevent or at least reduce the risk of the base 5 being torn open during penetration.

Figure 8:
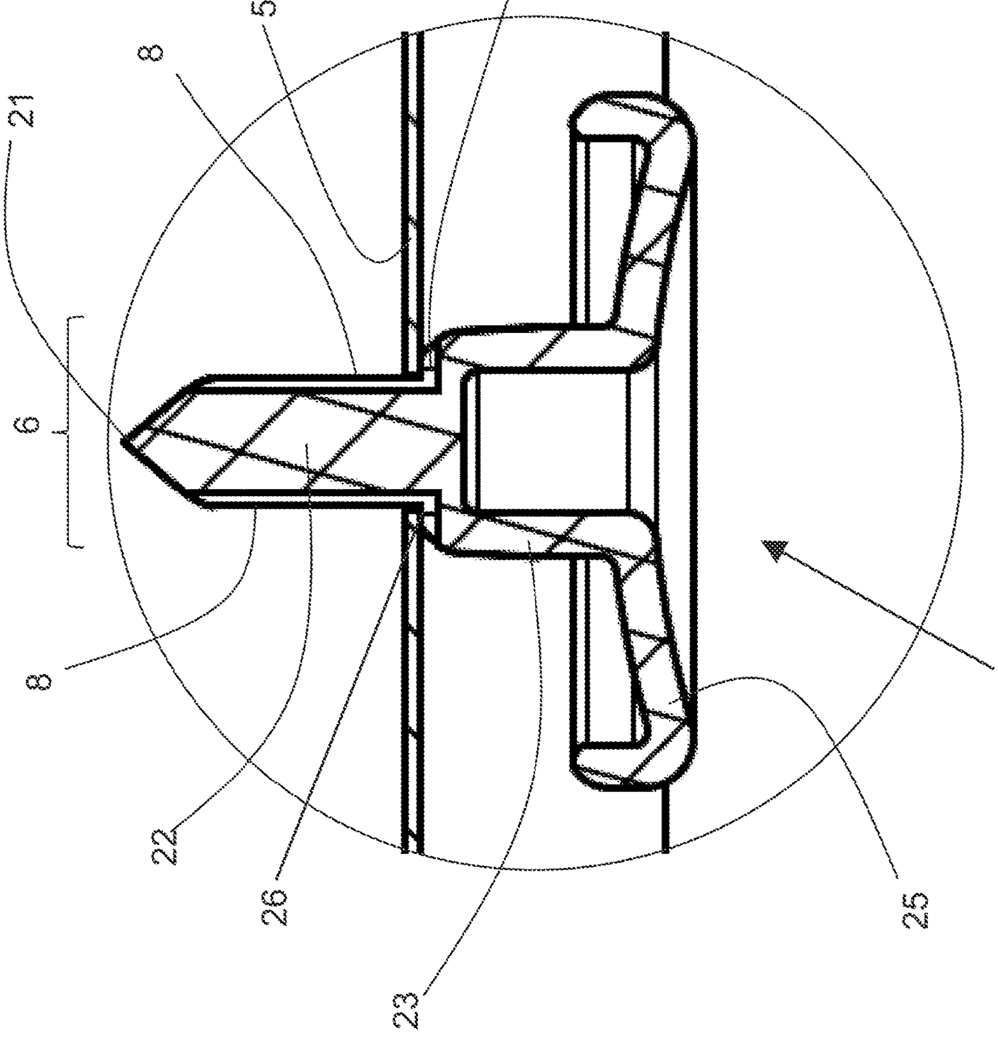
FIG. 8 shows a detail illustration of a piercing spike in a first state.

In order to put the paint cup 1 or the paint spray gun 2 into operation, the base 5 is pierced in a non-sealing manner (first penetration state) in the piercing point or region 6 using the piercing spike 7: as can be seen, for example, from FIG. 8, the piercing spike 7, which is of substantially rotationally symmetrical design, is constructed along its longitudinal axis from the penetration tip 21, a ventilation dome 22 having a first diameter d1, a sealing dome 23 having a second diameter d2, and a gripping region having the gripping disk 25 (actuating cap). Four ventilation channels 8, each in the form of an axial groove, extend along the ventilation dome 22. Ventilation channels 8', which are designed as radial grooves, are formed on the sealing dome 23, which can be of slightly spherical design, and continue the axial ventilation channels 8, with the result that the ventilation channels 8 are fluidically connected to the atmosphere. The piercing spike 7 is held in the first penetration state in that the base 5 is caught in a fixing groove 26.

In order to take the paint cup 1 or the paint spray gun 2 out of operation, the piercing spike 7 is moved from the non-sealing position into a sealing position (second penetration state): for this purpose, the sealing dome 23 of the piercing spike 7 is pushed further into or through the base 5 of the lid 10 until the lateral surface of the sealing dome 23 comes into sealing contact with the outer edge of the piercing region 6. The fluidic connection of the ventilation channels 8 to the atmosphere is thereby prevented. The lateral surface of the sealing dome 23 seals the piercing region 6. The piercing spike 7 is held in the second penetration state in that the base 5 is caught in a fixing groove 27.

In order to put the paint cup 1 or the paint spray gun 2 into operation again, the piercing spike 7 can be reset from the second penetration state into the first penetration state. It goes without saying, however, that there is certainly the risk that the piercing spike 7 will not remain in the first penetration state in a comparably stable manner on account of the widening of the hole in the base 5.

In order to prevent the piercing spike 7 from accidentally being removed or falling out of the base 5, the piercing spike 7 could also have one or more barbs or barb-like shaped elements arranged, for example, on the lateral surface of the first stage 22.

Figure 9A:
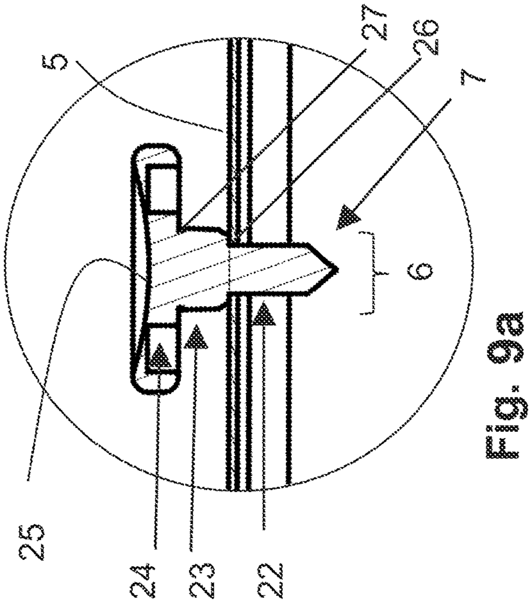
FIGS. 9*a* and 9*b* show a detail illustration of a piercing spike in a first and a second state.
Figure 9B:
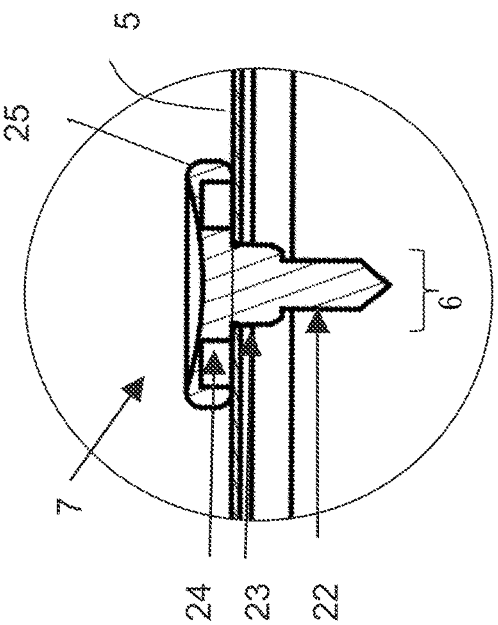

FIGS. 9*a* (first penetration state) and 9*b* (second penetration state) show a second embodiment of the piercing spike 7, in which the piercing spike 7, in addition to the ventilation dome 22 and the sealing dome 23, also has a third dome 24 within the grip 25, with a third diameter d3, where d1<d2<d3 applies to the diameter ratios. In contrast to the piercing spike 7 described in FIG. 8, the base 5 of the lid 10 in the piercing spike 7 of FIG. 9*b* in the second penetration state is sealed not only by the sealing contact of the lateral surface of the sealing dome 23 but additionally by the end face of the third dome 24 facing the base 5 or piercing region 6. As a result of the third dome 24, a higher sealing performance is thus possible. The end face of the third dome 24 could comprise further sealing means, e.g. a sealing ring made of an elastomeric material inserted in an annular groove.

Figure 11:
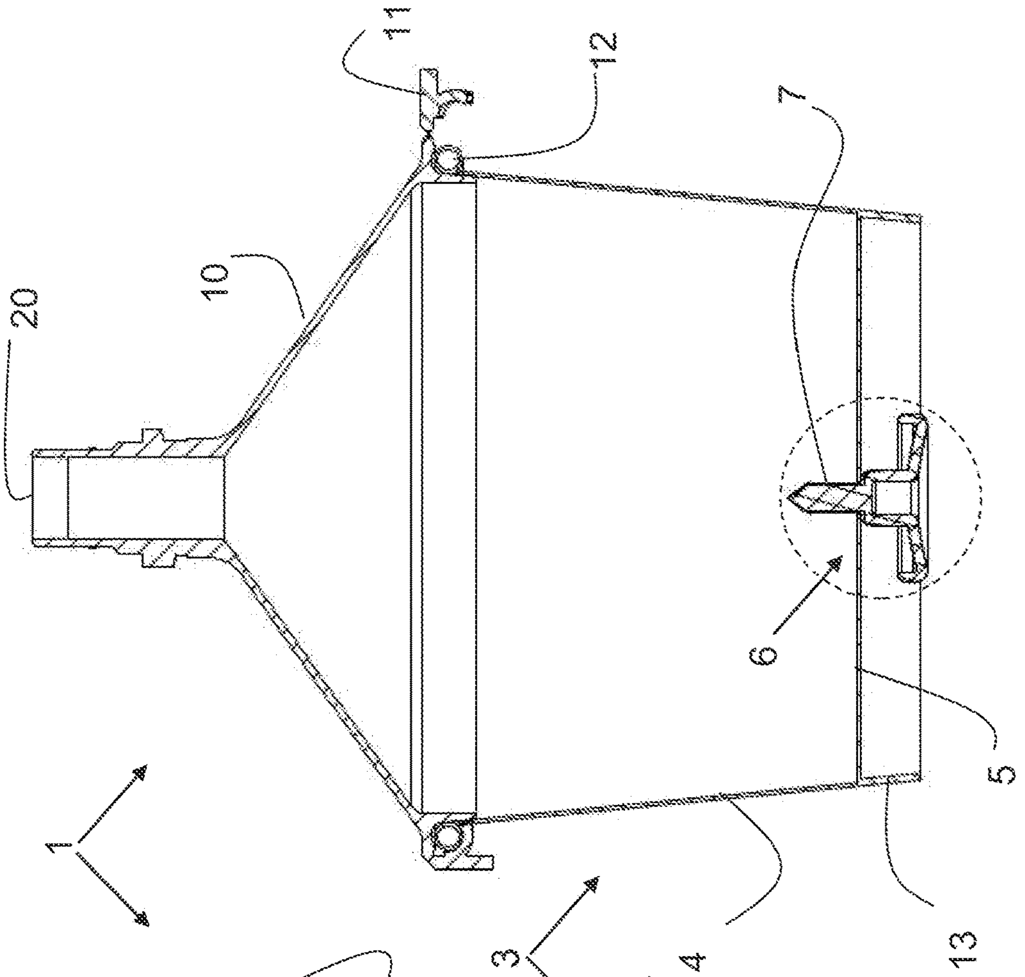
FIGS. 10 to 11 show a paint cup according to the invention in an embodiment as an upside-down variant in a front and a sectional view.
Figure 10:
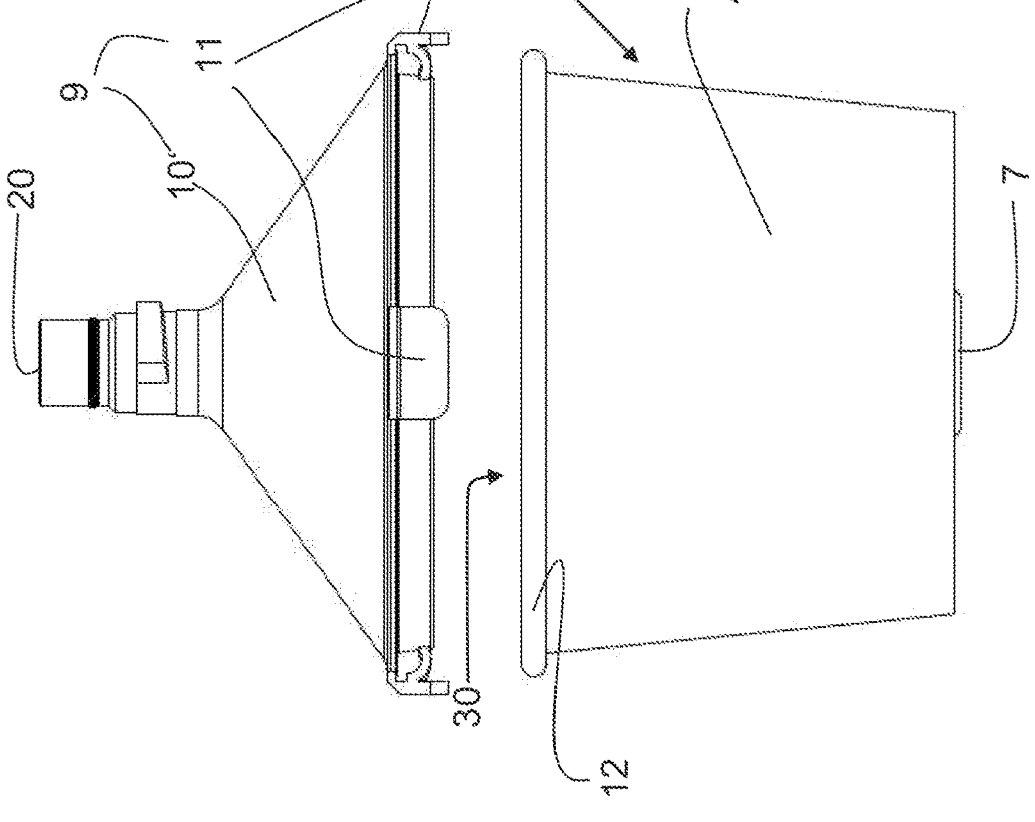
Figures 12, 13, 14:
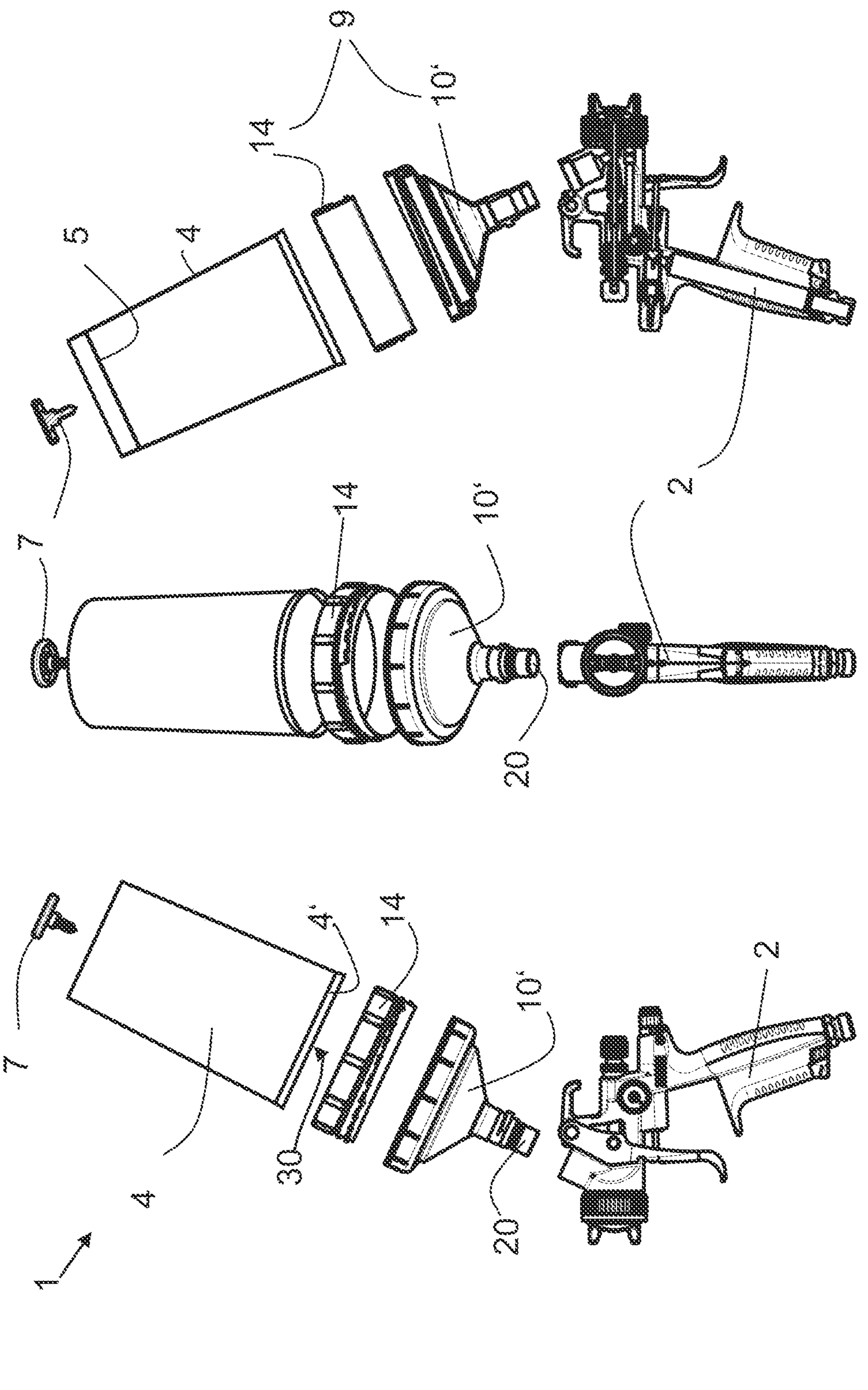
FIGS. 12 to 14 show a further variant embodiment of a paint cup according to the invention as an upside-down variant in a front and a sectional view.

Finally, FIGS. 10 to 11 and 12 to 14 show two further exemplary embodiments in upside-down variants. Upside-down means that the opening 4 of the paint container 3 is provided on the side facing the paint spray gun 2, wherein the opening 4 is closed or can be closed by a lid 10' having an outlet opening 20 for connection to the paint spray gun 2. The lid systems 9 of these exemplary embodiments are designed as clip lids with fastening elements 11 (FIGS. 10 and 11), which are attached in an articulated manner to the lid 10' by hinges and engage around a sealing bead 12 of the paint container 3, or, comparably to the lid system 9 of the first exemplary embodiment according to FIGS. 1 to 7, as a lid 10' with a counter-ring 14 (FIGS. 12 to 14). In a manner analogous to the previous exemplary embodiments, the base 5 of the paint cup 1 can be penetrated by the piercing spike 7, although the bases 5 here are not detachable but are formed integrally with the vessel wall 4 of the paint container 3. In this case, the vessel wall 4 is produced from the same material as the base 5.

Advantageously, the paint container 3 can be constructed on the base side with a standing collar 13, cf. FIG. 11, which makes it possible for the paint container 3 to be placed on its base 5 even with the penetrating piercing spike 7.

It is self-evident that components which are described in the description of the figures as cylinders or cylindrical can also have a shape which deviates (slightly) therefrom, such as, for example, conical, frustoconical, spherical, etc.

The invention claimed is:

1. A paint cup for a paint spray gun, the paint cup comprising:

- a paint container which has a vessel wall and a base,
- wherein the base is made of a natural fibrous material so as to be pierceable and has a piercing point or region in order to ventilate the paint cup,
- wherein the paint cup comprises a piercing spike, wherein the piercing spike is embodied in such a way that a ventilation valve for producing pressure compensation is formed by penetration of the base at the piercing point or region, and
- wherein the piercing spike has retaining means for fixing the piercing spike on the paint container in a ventilation stage in which the paint cup ventilates to the atmosphere and a sealing stage in which the paint cup does not ventilate to the atmosphere,
- wherein the piercing spike has at least four axially successive sections, wherein the first section is a penetration tip, the second section is a ventilation shaft section, the third section is a sealing shaft section, and the fourth section is an actuating cap,
- wherein the retaining means comprises a first circumferential fixing groove arranged between the ventilation shaft section and the sealing shaft section and a second fixing groove arranged between the sealing shaft section and the actuating cap, and
- wherein the first circumferential fixing groove is captured by the base to maintain the piercing spike in the ventilation stage and the second circumferential fixing groove is captured by the base to maintain the piercing spike in the sealing stage.

2. The paint cup as claimed in claim 1, wherein the piercing point or region is indicated optically and/or haptically.

3. The paint cup as claimed in claim 1, wherein the piercing spike has one or more axially extending ventilation channels.

4. The paint cup as claimed in claim 3, wherein the one or more axially extending ventilation channels are in the form of one or more axially extending grooves arranged on the circumference of the ventilation shaft section.

5. The paint cup as claimed in claim 1, wherein the piercing spike has one or more axially extending ventilation channels, which continue into one or more radially extending ventilation channels on an end face of the piercing spike.

6. The paint cup as claimed in claim 1, wherein the vessel wall is made of a natural fibrous material.

7. The paint cup as claimed in claim 1, wherein at least one of the vessel wall and the base is made of cardboard with a weight per square meter over 200 $g/m^2$.

8. The paint cup as claimed in claim 1, wherein at least one of the vessel wall and the base is provided, at least on the inside, with a liquid-resistant coating.

9. The paint cup as claimed in claim 8, wherein the liquid-resistant coating includes at least one of plastic and aluminum.

10. The paint cup as claimed in claim 1, wherein at least one of the vessel wall and the base is single-ply, two-ply or three-ply cardboard.

11. The paint cup as claimed in claim 1, wherein an end of the paint cup facing the paint spray gun has an outlet opening for connection to the paint spray gun or for connection to an adapter for connection to the paint spray gun.

12. The paint cup as claimed in claim 1, wherein the natural fibrous material is a cellulose-based fibrous material.

13. A method for using the paint cup as claimed in claim 1, the method comprising piercing the base to form a ventilation valve.

* * * * *